E. S. BEEMAN.
WHEEL RIM.
APPLICATION FILED MAR. 30, 1917.

1,286,206.

Patented Dec. 3, 1918.

INVENTOR
Edwin S. Beeman,
BY
George J. Oltsch
ATTORNEY

UNITED STATES PATENT OFFICE.

EDWIN S. BEEMAN, OF LAPORTE, INDIANA, ASSIGNOR OF ONE-HALF TO WILLIAM F. PUSCH, OF LAPORTE, INDIANA.

WHEEL-RIM.

1,286,206. Specification of Letters Patent. Patented Dec. 3, 1918.

Application filed March 30, 1917. Serial No. 158,618.

*To all whom it may concern:*

Be it known that I, EDWIN S. BEEMAN, a citizen of the United States, residing at Laporte, in the county of Laporte and State of Indiana, have invented certain new and useful Improvements in Wheel-Rims, of which the following is a specification.

The invention relates to wheel rims, and more especially to demountable or detachable rims which are bodily removable from the felly of the wheel, the rims supporting automobile tires in a manner which will permit the tires to be easily and quickly removed with relation to the rims, and which permit the rims with inflated tires thereon usually carried as extras to be quickly substituted on a wheel for a rim carrying a punctured or otherwise damaged tire.

The primary object of the invention resides in the provision of a sectional rim for automobile tires, in which the sections are locked in operative relation without the use of devices independent of the sections, whereby to eliminate all parts susceptible of working loose due to vibration and jar.

A further object of the invention resides in the provision of a sectional rim by means of which the positioning or removal of a pneumatic tire may be easily and rapidly accomplished, and which is exceedingly simple of form and highly efficient for the purpose intended.

With these and other objects in view, the invention, in its preferred form, will be described in the following specification, reference being had particularly to the accompanying drawings, in which:—

Figure 1:
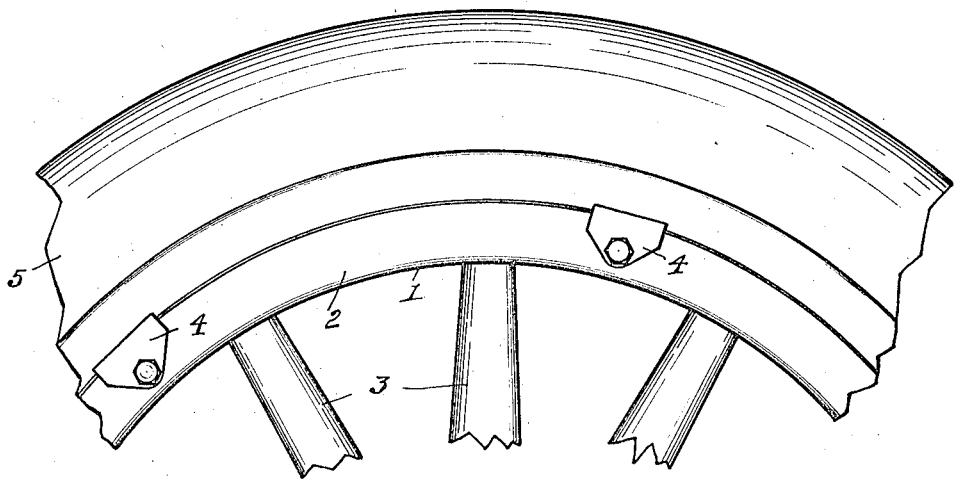
Figure 1 is a fragmentary side elevation of a tire embodying my invention.
Figure 2:
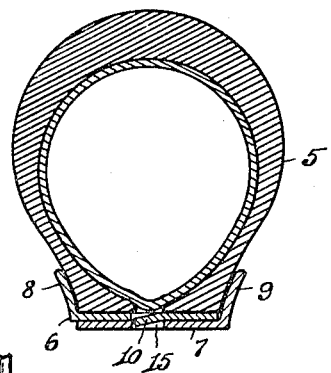
Fig. 2 is a cross section of my rim and tire.
Figure 3:
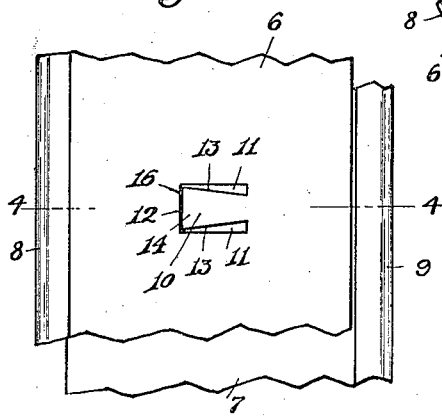
Fig. 3 is a plan view showing fragmentary portions of the rim sections.
Figure 4:
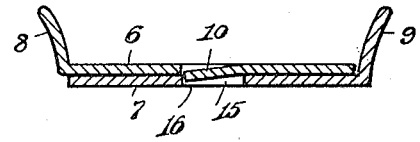
Fig. 4 is a cross section of the rim sections in locked relation taken on the line 4—4 of Fig. 3.

Referring to the drawings, 1 designates a wheel of ordinary construction, including the felly 2, spokes 3, and clamping lugs 4 for locking the rim upon which the pneumatic tire 5 is mounted in position upon the felly of the wheel, all as is well understood in the art, and all of which parts may be of any well known or approved construction.

The invention is more particularly concerned with the rim for supporting the pneumatic tire, same being of the demountable or detachable type, that is, not a fixed part of the wheel proper, and comprises two separable sections 6 and 7 of ring formation, the diametric dimension of the outer section 6 being slightly greater than the like dimension of the inner section 7, so that one section may be telescoped with relation to the other. Each section is provided with an outer annular flange 8 and 9, between which the sides of the tire are held and locked to the rim when in an inflated condition, as will be obvious. The outer rim section 6 is provided with a number of integrally formed lugs 10 disposed at suitable intervals around the said section, same being formed by punching or cutting through the face or flat portion of the section in a manner forming spaced tapering openings 11 and a crosscut 12, so that the side edges 13 of the lug will taper or converge from its free end 14 to their point of intersection with the body of the section. Each of the rim sections is made of suitable metal, and the outer section is preferably made of a metal having sufficient flexibility so that the lug 10, when bent inwardly at its free end, will yieldingly maintain said position. Formed in the inner rim section 7, and disposed around the rim at intervals corresponding with the lugs 10 of the outer section, are openings 15, with which the lugs 10 are adapted to register, the free end of the lugs, which are forced out of normal position in forcing the rim sections into operative position, automatically resuming their normal positions and extending into said openings. The free ends of the lugs will thus abut the opposing edges 16 of the openings, and the sections thus held against separation. The openings 15 are preferably rectangular in form and corresponding in size with the marginal edges of the cut-out portion of the outer rim in forming a lug, thus permitting a prying instrument to be inserted from the inner side of the inner rim between the lug and such cut-out portion, whereby the lug may be raised out of engagement with the opening of the inner section, and the sections separated without further hindrance.

It will be apparent from the foregoing description that I have provided an exceedingly simple rim structure for the purpose intended, the same consisting of but two interlocking parts, and the same being entirely devoid of any independent or separable locking devices, such as bolts, nuts, and the like, and therefore free of any parts liable to become loose or rattle.

While the foregoing is the preferred form of my invention, I desire it to be understood that I do not limit myself to the precise structure shown and described, as it is obvious that the same may be variously modified without departing from the spirit of the invention.

Having thus described my invention, what is claimed is:

A wheel rim comprising telescopic sections, one of said sections including lugs having yieldable free ends and of relatively greater transverse dimension at said ends, the free ends of the lugs normally extending outwardly of the section, and the other section having openings formed therein adapted to receive the free ends of the lugs, the openings having a transverse dimension which will provide a snug fit between the side edges of the extreme free ends of the lugs and the openings, and a relatively larger space therebetween in the direction of the fixed portions of the lugs.

In testimony whereof I affix my signature.

EDWIN S. BEEMAN.